United States Patent [19]

Conrad

[11] 4,452,697
[45] Jun. 5, 1984

[54] FILTER FOR DIESEL FUEL

[75] Inventor: Ulrich Conrad, Ludwigsburg, Fed. Rep. of Germany

[73] Assignee: Daimler-Benz Aktiengesellschaft, Fed. Rep. of Germany

[21] Appl. No.: 286,516

[22] Filed: Jul. 24, 1981

[30] Foreign Application Priority Data

Jul. 24, 1980 [DE] Fed. Rep. of Germany ....... 3027994

[51] Int. Cl.³ .............................................. B01D 35/02
[52] U.S. Cl. .................................... 210/172; 210/440; 210/DIG. 17
[58] Field of Search ............... 210/186, DIG. 17, 168, 210/172, 437, 440; 215/13 R; 220/426

[56] References Cited

U.S. PATENT DOCUMENTS

| 48,172 | 6/1865 | Halle | 210/186 |
|---|---|---|---|
| 3,861,565 | 1/1975 | Rickmeier, Jr. | 215/13 R |
| 4,314,903 | 2/1982 | Hanley | 210/DIG. 17 |

Primary Examiner—Peter A. Hruskoci
Assistant Examiner—Sharon T. Cohen
Attorney, Agent, or Firm—Craig & Burns

[57] ABSTRACT

A filter for diesel fuel, with the filter including a filter housing surrounding a filter pack. The filter housing is of a double shell construction and an interspace is provided between the two housing shells. The interspace is tightly sealed all around to an exterior of the housing.

1 Claim, 1 Drawing Figure

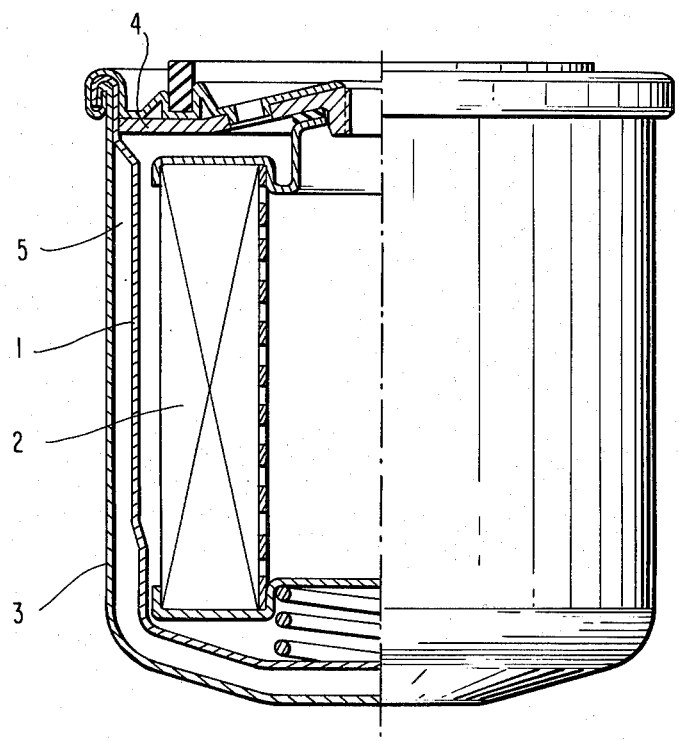

FILTER FOR DIESEL FUEL

The present invention relates to a filter and, more particularly, for a filter for diesel fuel which includes a filter housing surrounding a filter pack or element.

In order to provide for a functionally appropriate construction of a fuel circulation system in air-compressing internal combustion engines, preferably, the fuel filter should be mounted directly to the engine; however, due to space conditions, filter positions are encountered in such constructions wherein the fuel is heated up at the high outside temperature and cooled off at lower temperatures. Either the heating or cooling process is undesirable since at a high fuel temperature, gas bubbles are separated and the efficiency of the internal combustion engine is reduced. When the fuel temperatures are too low, paraffin components separate from the fuel, with the paraffin components adhering to the filter pack and clogging the same. In either the heating or cooling process of the fuel, the internal combustion engine may come to a standstill or stall due to an interrupted fuel supply.

In, for example, Offenlegungsschrift No. 2,841,249, a fuel filter arrangement is disclosed which is combined with a heat exchanger connected to a cooling water circulation system of the internal combustion engine in such a manner, that with an increasing cooling water temperature, the fuel is heated up. A disadvantage of this proposed construction resides in the fact that, aside from the arrangement requiring a relatively high cost because of precautionary measures which are necessary against an overheating of the fuel once the internal combustion engine has reached its operating temperature, this proposed arrangement of fuel preheating offers no advantage if, due to the effects of low temperatures, paraffin proportions from the fuel have already climbed up the filter pack prior to a starting of the internal combustion engine.

The aim underlying the present invention essentially resides in providing a fuel filter which is constructed in such a manner so as to afford an improved protection in winter time against the cold even when the internal combustion engine is at a standstill and also to prevent an over-heating of the fuel during a summertime operation of the engine.

In accordance with advantageous features of the present invention, the filter for the diesel fuel is provided with a fuel housing surrounding a filter pack or element, with the filter housing being of a double-shell construction and having an interspace between the two housing shells which is tightly sealed all around.

By virtue of the above-noted double-shell structure of the filter housing, a sufficient insulation is obtained with respect to external weather influences, which insulation protects the fuel filter overheating and also against the cold.

Advantageously, in accordance with further features of the present invention, the interspace between the two housing shells may be filled with air under atmospheric pressure so as to result in a simple and economical arrangement since air exhibits especially good-heat-insulating properties.

Accordingly, it is an object of the present invention to provide a filter for diesel fuels which avoids, by simple means, shortcomings and disadvantages encountered in the prior art.

Another object of the present invention resides in providing a filter for diesel fuel which is simple in construction and therefore relatively inexpensive to manufacture.

A still further object of the present invention resides in providing a filter for diesel fuel which insulates the fuel from the cold or warm environment in which the engine is operated.

A still further object of the present invention resides in providing a filter for diesel fuel which is simple in construction and therefore relatively inexpensive to manufacture.

Yet another object of the present invention resides in providing a filter for diesel fuel which functions reliably under all operating or load conditions of the engine.

These and other objects, features, and advantages of the present invention will become more apparent from the following description when taken in connection with the accompanying drawing which shows, for the purposes of illustration only, one embodiment in accordance with the present invention, and wherein:

The single FIGURE of the drawing is a partial cross sectional view of a fuel filter for diesel fuel constructed in accordance with the present invention.

Referring now to the single FIGURE of the drawing, according to this FIGURE, a fuel filter for diesel fuel includes a filter housing having an internal housing shell 1 and an external housing shell 3, with a filter pack or element 2 being arranged inside of the internal housing shell 1. The housing shells 1, 3 are nestled or disposed one inside the other and are joined by a flanging with a cover plate 4. An interspace 5 is provided between the internal housing shell 1 and the external housing shell 3, with the interspace 5 being filled with air under atmospheric pressure so as to enable the air to act as an insulation for the fuel filter against cold and heat.

While I have shown and described only one embodiment in accordance with the present invention, it is understood that the same is not limited thereto but is susceptible of numerous changes and modifications as known to one having ordinary skill in the art and I therefore do not wish to be to the details shown and described herein, but intend to cover all such modifications as are encompassed by the scope of the appended claims.

I claim:

1. A filter arrangement for diesel fuel, the filter including a filter housing having an inner shell and a filter pack therein, the arrangement comprising
    means for reducing gas bubble formation in and paraffin condensation from said diesel fuel by reducing heat transmission from and to the interior of the inner shell, said means for reducing comprising
    outer shell means for tightly sealing in an interspace between said inner shell and other shell means, a body of air at atmospheric pressure adjacent said inner shell reducing movement of said body of air with respect to the inner shell to insulate the inner shell against heat transmission from and to the interior of the inner shell, and wherein
    the outer shell means for sealing the interspace comprises a cover member having a flange at an outer periphery thereof.

* * * * *